H. A. OLSON.
FISHING APPLIANCE.
APPLICATION FILED SEPT. 9, 1918.

1,307,513.

Patented June 24, 1919.
2 SHEETS—SHEET 1.

Inventor.
Hans A. Olson
by Heard Smith & Tennant
Attys.

H. A. OLSON.
FISHING APPLIANCE.
APPLICATION FILED SEPT. 9, 1918.

1,307,513.

Patented June 24, 1919.
2 SHEETS—SHEET 2.

Inventor.
Hans A. Olson
by Heard Smith & Tennant
Attys.

UNITED STATES PATENT OFFICE.

HANS A. OLSON, OF REVERE, MASSACHUSETTS.

FISHING APPLIANCE.

1,307,513. Specification of Letters Patent. Patented June 24, 1919.

Application filed September 9, 1918. Serial No. 253,153.

*To all whom it may concern:*

Be it known that I, HANS A. OLSON, a citizen of the United States, and resident of Revere, county of Suffolk, State of Massachusetts, have invented an Improvement in Fishing Appliances, of which the following description, in connection with the accompanying drawing, is a specification, like characters on the drawing representing like parts.

This invention has for its object to provide a novel fishing appliance to be carried by a boat and constructed to scoop up the fish and deliver them into the boat as the boat is moving through the water.

In order to give an understanding of my invention I have illustrated a selected embodiment thereof which I will now proceed to describe. The novel features will be pointed out in the appended claims.

Figure 1 of the drawings is a side view of a boat equipped with my invention,

Figure 1:
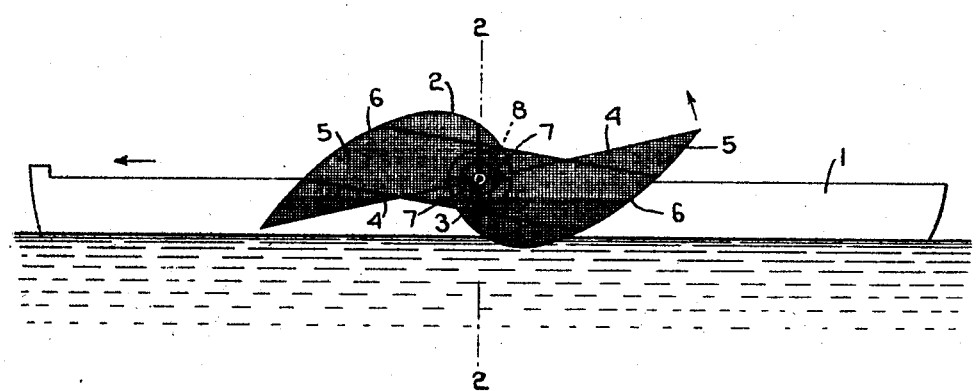
Figure 2:
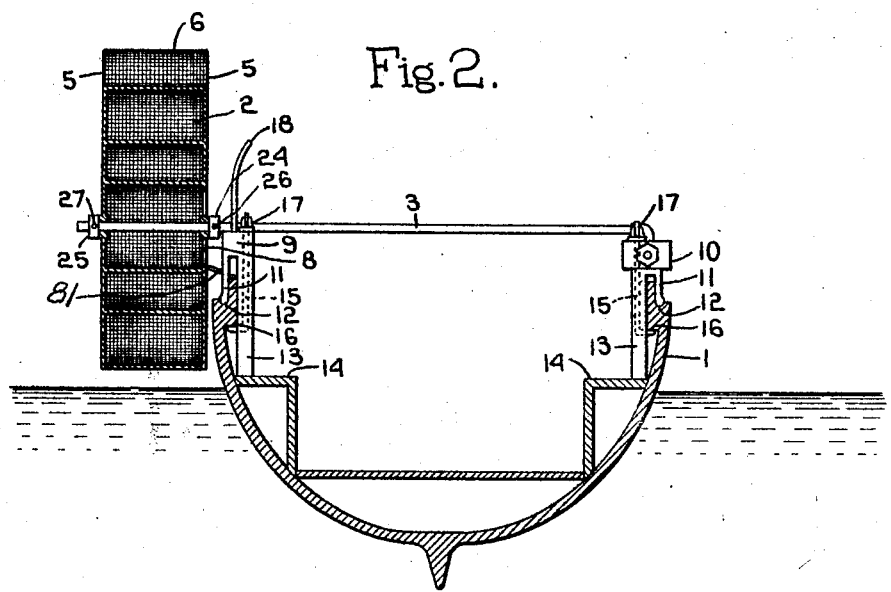
Fig. 2 is an enlarged section on line 2—2 Fig. 1.
Figure 3:
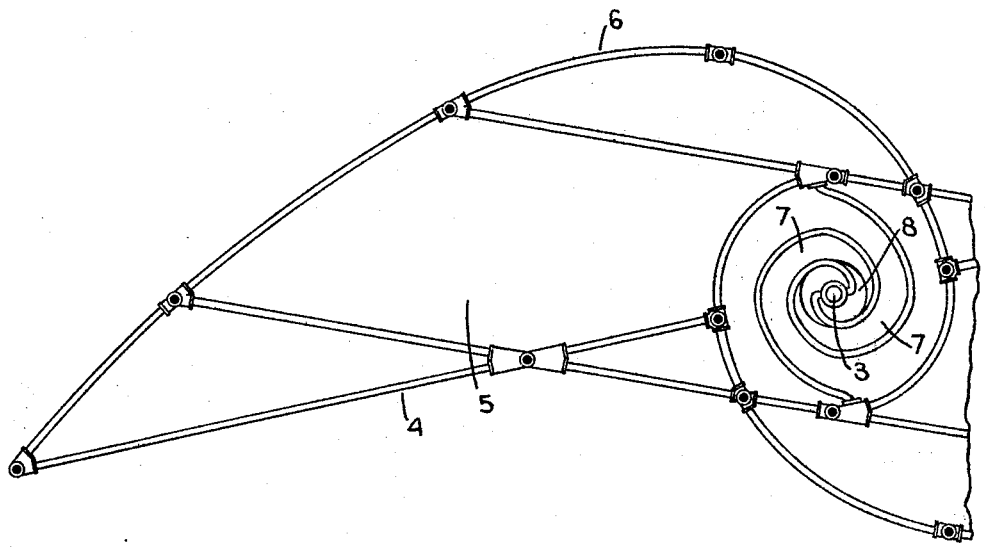
Fig. 3 is an enlarged view of one of the scoops.
Figure 4:
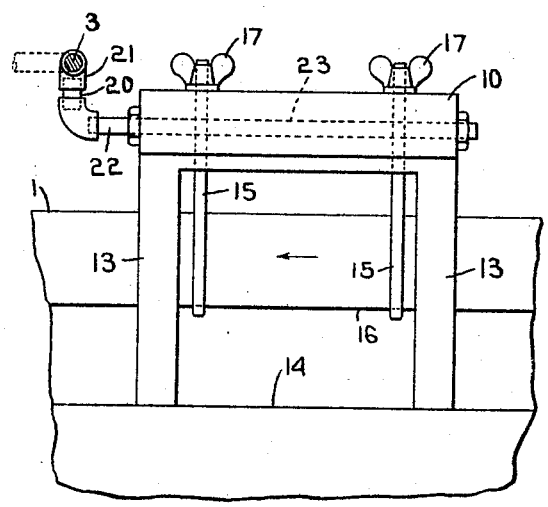
Fig. 4 is a detail view of the support for one end of the shaft.
Figure 5:
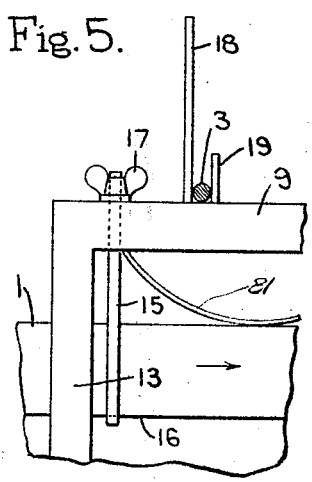
Fig. 5 is a view of the support for the other end of the shaft.

My improved device is in the nature of a scoop mounted on a boat for rotary movement and constructed so that the forward movement of the boat will give a rotary fish-scooping movement to the scoop through the water. The scoop is also arranged so that any fish that are scooped up thereby will be deposited into the boat automatically.

The boat is shown at 1 and the scoop at 2, the latter being situated at one side of the boat and rotatively mounted on a shaft or rod 3 that extends transversely of the boat. The scoop comprises two oppositely-disposed scoop portions each of which has an open top 4 and side walls 5 and bottom 6 of reticulated material which allows the water to drain out of the scoop when it is raised. At the central portion of the scoop are two spiral shaped passages 7 which communicate at their outer ends with the scoop portions and at their inner ends with an opening 8 formed in the inner side wall 5 at the center of the scoop.

The scoop is so constructed that as the boat moves forwardly the resistance of the water will cause the scoop to rotate in the direction of the arrow and the scoop is so supported that as it rotates the scoop portions are alternately dipped into and raised from the water. This operation will scoop up any fish which may be following the movement of the boat along the side thereof, and the fish thus caught will be carried through the spiral passages 7 by the rotary movement of the scoop and will be deposited in the boat through the opening 8. 81 indicates an inclined deflector which operates to receive the fish delivered from the opening 8 and deflect them into the boat. The scoop is made with a framework of the proper shape and preferably of piping and with walls of twine mesh which are secured to the framework.

The means for supporting the shaft are constructed so as to allow the shaft to rise in case the scoop strikes bottom, and also so as to permit the shaft to swing forward or backward when it is desired to place the scoop in the boat as the boat travels to and from the fishing ground.

The end of the shaft adjacent the scoop is supported on a rest 9 which is clamped to one edge of the boat and the other end of the shaft is supported by a rest 10 that on a larger boat may be secured to the deck or on a small boat may be clamped to the outer edge of the boat. Each rest is provided with an arm 11 that engages the gutter 12 and with legs 13 that rest on the seat 14 and each rest is clamped to the boat by clamps 15 that engage the shoulder 16 and extend upwardly through the rests and hand clamping nuts 17 secured on their upper ends.

The rest 9 is provided with two vertical fingers 18 and 19 between which the shaft 3 is received. The rear finger 18 is considerably longer than the front finger so that in case the scoop strikes bottom and thus raises the shaft off from the rest 9 said shaft will not be carried over the rear finger, but will merely drop back into place again when deep water is reached.

The end of the shaft adjacent the rest 10 is provided with swivel connections so as to permit the other end thereof to be raised and lowered and to be swung forwardly and backwardly, said shaft has the vertical portion 20 having a swivel joint 21 thereon and the horizontal portion 22 that extends at right angles to the main part of the shaft and is secured to the rest 10. Said horizontal portion 22 has a bearing 23 therein. The swivel 21 permits the shaft to swing toward the front or rear of the boat and the bearing 23 permits the shaft to be swung up or down. With this construction it is possible to swing the shaft upwardly sufficiently to free it from the fingers 18 and 19 and to carry the scoop above the edge of the boat and then to swing the shaft forwardly or backwardly so as to place the scoop within the boat while the boat is traveling to and from the fishing ground.

Other means may be provided for enabling the scoop to be loaded into the boat, for example the scoop may be held in place upon the shaft 3 between collars 24 and 25 slidably mounted upon the shaft 3 and secured thereon by set screws 26 and 27. This will permit loading of the scoop into the boat by loosening of the set screw 26 and sliding a collar 24 along the shaft sufficiently to enable the scoop as a whole to slide on the shaft into the boat.

The shape of the scoop portions is such that they will be rotated rapidly when in a vertical position and slowly when in a horizontal position. Hence they will enter the water without any splash and will have a rapid movement at the point when such movement is needed to catch the fish.

It will be noted that while each scoop is in the water, the turning movement thereof is accomplished by the pressure of the water thereagainst and while each scoop is out of the water its turning movement is effected by the pressure of the water against the other scoop. Hence each scoop constitutes means for turning the other scoop from the point where it leaves the water to the point where it enters the water again.

It will be understood that the embodiment of the invention disclosed herein is illustrative and not restrictive and that various modifications may be made within the spirit and scope of the following claims.

Having thus described my invention what I claim as new and desire to secure by Letters Patent, is;

1. In a fishing appliance, the combination with a boat of a shaft extending transversely of the boat said shaft being anchored at one end and provided with swivel joints which permit the free end to be swung up and down, forward and backward and a fish scoop carried by and freely rotatable on the free end of the shaft and means associated with the scoop and adapted to be acted on by the water to assist in giving the scoop its rotative movement.

2. In a fishing appliance, the combination of a boat, of a support at each side thereof, a shaft anchored to one support and resting freely on the other support, said shaft having a swivel joint near its anchored end, a fish scoop rotatively mounted on said shaft and adapted as it rotates to dip into and be raised from the water, and means associated with the scoop to rotate it when it is out of the water.

3. In a fishing appliance, the combination with a boat, of a shaft extending transversely thereacross, a two section fish scoop loosely mounted on said shaft at the side of the boat, each section of the scoop terminating at its inner end in a spiral-shaped passage which opens through the inner side wall of the scoop at the central portion thereof.

4. In a fishing appliance, the combination with a boat, of rests detachably clamped to the sides thereof, a shaft supported on said rests, said shaft being pivotally connected to one rest, a scoop member rotatively mounted on said shaft and adapted to be dipped into and be raised from the water as it rotates, and means associated with the scoop to rotate it when it is out of the water.

5. In a fishing appliance, the combination with a boat, of a shaft extending transversely thereof, a scoop rotatably mounted upon said shaft and adapted to be dipped into and raised from the water as it rotates, the pressure of the water against the scoop due to the forward motion of the boat operating to give rotative movement to the scoop while it is in the water, and means also acted on by said pressure of the water to continue the rotative movement of the scoop when it is out of the water.

6. In a fishing appliance, the combination with a boat, of a shaft extending transversely thereof, a scoop rotatably mounted upon said shaft and adapted to dip into and rise from the water as it rotates, said scoop having provision for permitting the discharge into the boat of fish caught thereby; and means associated with the scoop and acted on by the pressure of the water as the boat moves forward to maintain rotative movement of the scoop while it is out of the water.

7. In a fishing appliance, the combination with a boat, of a shaft extending transversely of said boat, a pair of oppositely disposed symmetrically arranged scoop members, each having a curved bottom merging into a central spiral wall adjacent the shaft and each being provided with an opening in its side adjacent the boat whereby when the boat moves forward the pressure of the water acting upon the bottoms of the scoop members alternately will cause the rotation thereof and the delivery of fish caught therein through said central opening into the boat.

In testimony whereof I have signed my name to this specification.

HANS A. OLSON.

Copies of this patent may be obtained for five cents each, by addressing the "Commissioner of Patents, Washington, D. C."